Patented Aug. 5, 1952

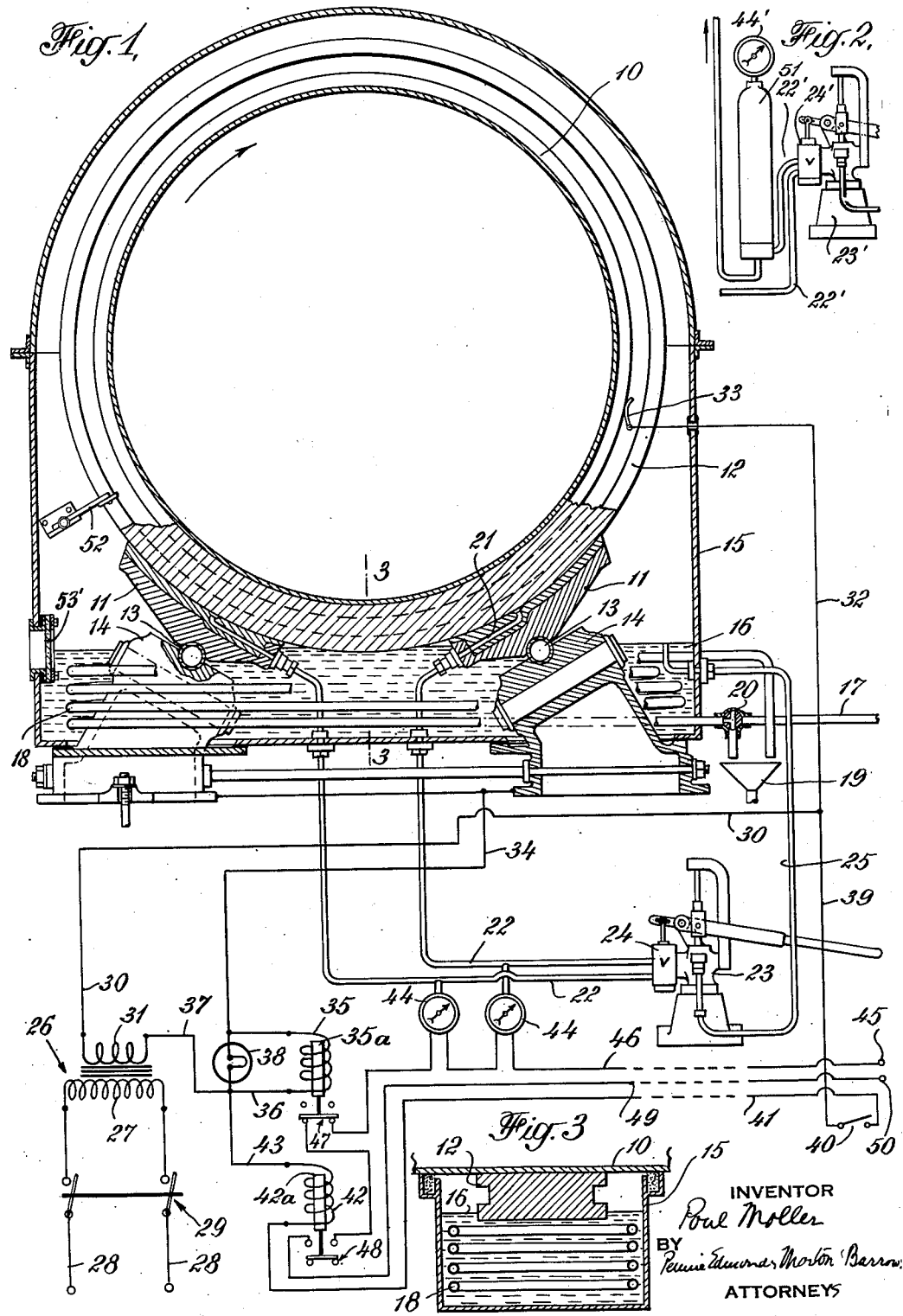

2,606,081

UNITED STATES PATENT OFFICE 2,606,081

PROTECTIVE APPARATUS FOR BEARINGS

Poul Moller, Copenhagen, Denmark, assignor to F. L. Smidth & Co., New York, N. Y., a corporation of New Jersey Application August 1, 1947, Serial No. 765,508
In Denmark October 28, 1943

Section 1, Public Law 690, August 8, 1946
Patent expires October 28, 1963

4 Claims. (Cl. 308—73)

This invention relates to rotary structures, such as grinding mills, drying drums, rotary kilns, and the rotors of large steam turbines or electric generators, which are supported for rotation by means of bearing elements, sliding one upon another. More particularly, the invention is concerned with a novel rotary structure installation which includes improved means for lubricating the parts sliding in contact and also means for preventing rotation of the structure, so long as the relatively sliding parts are in metallic contact and there is no lubricant between them.

Installations, which include heavy rotary structures sliding on bearing surfaces, require the presence of a film of oil between the contacting bearing surfaces throughout operation, and certain forms of bearings are so constructed that a film of oil is maintained between them, so long as the structure is in rotation. However, when such an apparatus stops, the oil is forced out of the bearings and it is necessary that the oil film be restored before rotation of the structure is started again. The loss of the oil film between the bearing surfaces of such an installation is most likely to occur in those forms of apparatus, in which there is a long period of idleness between working periods, and, while the operators of such equipment are instructed not to start them in operation, until oil has been forced between the bearing surfaces, there is always a risk that the operator will forget to pump the oil to the surfaces or that the oil will not reach the surfaces because of a defect in the pumping apparatus.

The present invention is directed to the provision of an installation including a heavy rotating structure of the types above mentioned, which includes means for preventing operation of the apparatus, so long as the bearing surfaces are in metallic contact with no oil between them. For starting, oil drawn from the oil reservoir at the normal operating oil level is conducted to the bearing surfaces under pressure. The installation also includes improved means for lubricating the bearing surfaces during the rotation of the structure during the working period. Ordinarily, the rotary structure is driven by an electric motor and, in that event, starting of the motor until it is certain that there is an oil film between the bearing surfaces may be prevented in various ways. Thus, a low-voltage protection circuit, commonly called a "no-voltage circuit," arranged to trip a circuit breaker for the motor, may include one or more contact devices which are closed only when the bearing surfaces for the structure are separated by an oil film, or when oil has been supplied to the surfaces until a pressure exceeding a selected value has been built up. Preferably, the no-voltage circuit includes contact devices of both sorts, although either may be used alone. The invention also provides interlocking between the electrical protection circuit and the oil supply for the bearings such that the apparatus cannot be started unless the oil level in the reservoir is sufficient to insure proper lubrication during running. This subject matter is claimed in divisional application Serial No. 98,150, filed June 9, 1949.

For a better understanding of the invention, reference may be made to the accompanying drawing, in which Fig. 1 is a transverse sectional view through an installation constructed in accordance with the invention;

Fig. 2 is an elevational view of a modified part of the installation;

Fig. 3 is a sectional view on the line 3—3 of Fig. 1, and

Figure 4:
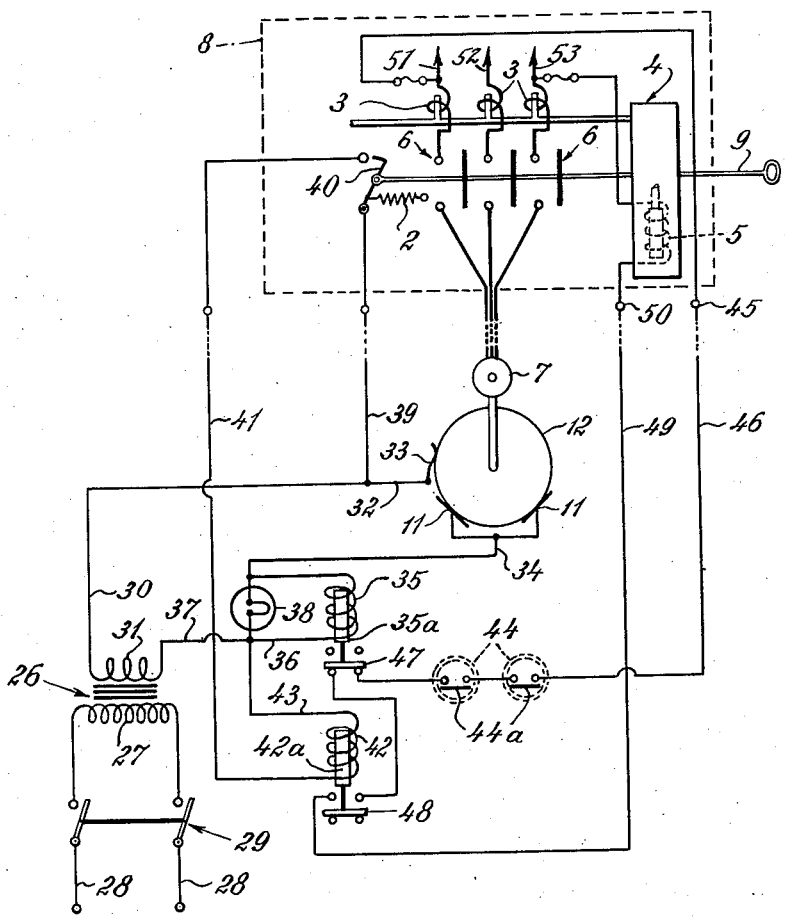
Fig. 4 is a circuit diagram of the motor control circuits including the protection circuit and appurtenant apparatus.

The rotary structure 10 of the installation illustrated is a rotary grinding mill in the form of a drum, which is supported for rotation on pairs of slide shoes 11 engaging slide rings 12 encircling the drum. Each shoe rests upon a cylinder 13 mounted on a base member 14 with its axis parallel to the axis of the drum and the shoes are disposed on opposite sides of the vertical axial plane through the drum with the lower ends of their working surfaces spaced above a horizontal plane tangent to their ring 12 at its lowest point. The mentioned vertical plane would include line 3—3 of Fig. 1. Each ring and its shoes and their bases are enclosed within a casing 15, encircling the drum, and the lower part of the casing is oil-tight and shaped to form an oil reservoir which contains a body of oil 16. The level of the oil within the casing is maintained at such a height that the oil is above the mentioned horizontal plane so that it touches the bottom of ring 12 but does not reach the lower ends of the working surfaces of the shoes 11. The actual oil level in the reservoir can be observed in the oil level glass 53′ provided in the side of casing 15. The oil is preferably cooled during the operation of the apparatus and, for this purpose, a cooling fluid supplied through a line 17 is circulated through a coil 18 within the casing below the level of the oil and discharged into a collecting funnel 19. The line 17 is provided with a three-way valve 20, so that the fluid may be drained from the coil.

Each of the shoes is formed with a passage 21 opening at one end at a port on the working face of the shoe, and oil is supplied to the other end of the passage through a conduit line 22 connected to a hand pump 23 through a distributing valve 24. A suction line 25 leads from the interior of casing 15 to the intake of the pump and the height of the oil-receiving opening in line 25 within the casing is that at which the oil level in the casing should be maintained to provide proper lubrication during running. The valve 24 is so constructed that the oil discharged from the pump is automatically directed alternately into the lines 22 leading to the respective shoes.

Referring to Figs. 1 and 4, the means for preventing starting of the drum, when there is no oil film between shoes 11 and ring 12, includes a transformer 26, the primary 27 of which can be supplied with current from a suitable current source through a switch 29. Current source 28 may conveniently be derived from power source 51, 52, 53, although it may be independent thereof. A line 30 leading from one end of the secondary 31 of the transformer is connected by a branch line 32 to a contact member 33 bearing against the ring 12. A line 34 connected to the shoes, either directly or through their bases, leads to one end of a solenoid 35, the other end of which is connected by lines 36, 37 to the other end of a secondary 31. A signal lamp 38 is connected across solenoid 35. A branch line 39 leading from line 30 is connected to one terminal of an auxiliary switch 40 on the circuit breaker 8, the other terminal of which is connected by line 41 to one end of a solenoid 42. The other end of solenoid 42 is connected by a line 43 to line 37, and through that line to one end of secondary 31. The above-mentioned auxiliary switch 40 is mounted at the circuit breaker for actuation by the initial movement of the circuit breaker so as to close before the main circuit breaker contacts 6 can move to closed position. The circuit breaker is of the well-known safety type including the usual overload release coils 3 and a low-voltage or no-voltage release coil 5 as well as a lock-out mechanism 4 which prevents manual closure of main contacts 6 when coil 5 is de-energized.

Each of the oil lines 22 for supplying oil to the shoes has a branch leading to a pressure gauge 44 and, within each gauge are contacts 44a, which are closed, when the pressure of oil acting on the gauge exceeds a selected value. The contacts within the gauges are in series in the no-voltage circuit of the circuit breaker of the motor 7 which drives the drum, the circuit starting from terminal 45 and including line 46, the gauge switch contacts 44a, a normally closed solenoid switch 47 operable by the plunger 35a of solenoid 35, a normally open solenoid switch 48 operable by plunger 42a of solenoid 42, and line 49 leading to terminal 50.

In the modified construction shown in Fig. 2, a line 22' leads from the distributing valve 24' associated with pump 23' to each slide shoe, and, in each line 22', there is a tank 51, to which a pressure gauge 44' is connected. With this arrangement, excessive oscillation of the gauge in rhythm with the strokes of the pump 23' is prevented by the damping effect of tank 51. It is understood that gauge 44' includes contacts which are connected in the manner that contacts 44a are connected in Fig. 4.

When the operator desires to start rotation of drum 10, he first closes switch 29 connected to current source 28, and current passes from the secondary 31 of the transformer 26 through lines 30 and 32 to contact 33 and ring 12. If the ring and either shoe 11 is in metallic contact, because of the absence of a lubricating film between the shoe and the ring, current flows from the ring to the shoe in metallic contact therewith and then through line 34 to solenoid 35. The current causes the solenoid to be energized, so that switch 47 in the no-voltage circuit of the circuit breaker 8 of the motor 7 is opened and the motor can not be started. Lamp 38 is also lighted, warning the operator that the shoe lubrication is deficient. The operator then operates pump 23 to pump oil to the shoes and, when the pressure of the oil supplied to both shoes exceeds the values for which the gauges are set, the gauge contacts in the no-voltage circuit of the circuit breaker are automatically closed. The operator can tell when the desired pressure has been reached by reference to the gauge needles and, when there is a film of oil between both shoes and ring 12, the circuit through solenoid 35 is deenergized and switch 47 in the no-voltage circuit is closed. The no-voltage circuit is still open, however, because the circuit through solenoid 42 is not closed at switch 40, and switch 48 in the no-voltage circuit remains open, until solenoid 42 is energized. When the pumping of the oil has been completed, the operator, by moving handle 9, starts to close contacts 6 of the circuit breaker, through which current is supplied to the motor from power source 51, 52, 53, and, in the initial part of the closing operation, switch 40 is closed. This causes solenoid 42 to be energized, closing switch 48, and the no-voltage circuit is then completed to the two outward legs 51, 53 of the power source. The closing of the circuit breaker is then completed and the motor starts to operate. In accordance with usual practice, it is assumed that a suitable starting resistance may be connected to the rotor of the motor, if desired.

The utmost protection against damage to the bearing surfaces of the installation is provided by utilizing the circuit established through the bearing surfaces, when they are not separated by the oil film, and employing contacts in the no-voltage circuit of the circuit breaker, which are controlled by the oil pressure gauges, but either of these expedients may be employed alone. The use of the circuit established by metallic contact between the bearing surfaces provides protection not only at the starting of a working period but also throughout operation, since the circuit breaker of the motor will be opened by spring 2 upon opening of its no-voltage circuit resulting, for example, from leakage of the oil from casing 15, or falling of the oil level within the casing, so that the oil does not touch the surface of ring 12.

If protection of the bearings is provided by employing only the circuit including the ring and slide shoes and not using contacts controlled by the pressure gauges, it is important that normally open solenoid switch 48 be employed, since without this switch, it would be possible for the operator to start the motor without closing switch 29. Until switch 29 is closed, the no-voltage circuit of the circuit breaker is normally closed through switch 47 but normally open at switch 48. Thus, if solenoid 42 and switch 48 were omitted and no gauge contacts 44a were employed, the no-voltage circuit would be established, if the bearing surfaces were in metallic contact and switch 29 were not closed.

As pointed out above, the intake end of pipe 25 leading to the pump lies at the level at which the oil should be maintained within casing 15. If the oil falls below that level and the operator attempts to pump oil to the bearings as in preparation for starting rotation of the drum, the pump can not take in any oil and no oil will be supplied to shoes 11. Since, in the absence of oil between the bearing surfaces the driving motor is prevented from running, it follows that the drum cannot be started unless the oil level in the oil reservoir is sufficient to insure proper lubrication during the working period of the mill. The operator will then realize, especially after inspection of oil-level gauge 53', that the body of oil within the casing needs replenishing. When the oil is at the proper level within the casing, the ring 12 continuously picks up oil which serves to maintain the films between the ring and shoes 11. Excessive oil may then be removed from the sides of the ring by spring-pressed scrapers 52 mounted at any convenient place within the casing.

I claim:

1. An installation which comprises, a heavy rotary structure having an encircling slide ring secured thereto, a casing encircling the structure and enclosing the ring, the lower part of the casing being oil-tight and forming an oil reservoir, slide members engaging the ring and supporting the structure, the members having elongated working surfaces extending circumferentially of the ring and in contact therewith and the members being disposed on opposite sides of a vertical plane through the axis of the structure with the lower ends of their working faces above a first horizontal plane which is tangent to the bottom of the ring, at least one oil port opening onto the working face of each slide member, said ring being adapted to dip into oil in said reservoir and to carry it to the working faces of said slide members, an oil outlet from the casing having an oil-receiving opening disposed in the casing at a level between said first horizontal plane and a second horizontal plane passing through the upper ends of the working faces of the slide members, and oil circulating means including conduit means connecting said oil outlet to the ports on the working faces of said slide members.

2. An installation, which comprises a heavy rotary structure having an encircling slide ring secured thereto, a casing encircling the structure and enclosing the ring, the lower part of the casing being oil-tight and forming an oil reservoir, slide members engaging the ring and supporting the structure, the members being symmetrically disposed on opposite sides of a vertical plane through the axis of the structure with the lower ends of their working faces above a first horizontal plane which is tangent to the bottom of the ring, and at least one oil port opening onto the working face of each slide member, said ring being adapted to dip into oil in said reservoir and to carry it to the working faces of said slide members, an oil outlet from the casing having an oil-receiving opening disposed in the casing at a level between the first horizontal plane and a second horizontal plane passing through the upper ends of the working face of said slide member, oil circulating means including conduit means connecting said oil outlet to the ports of the working faces of said slide members, an oil level gauge secured in a side of said casing and positioned to include the vertical distance at least between said first horizontal plane and the lowest one of the lower ends of the working faces of said members.

3. An installation which comprises, a heavy rotary structure having an encircling slide ring secured thereto, a casing encircling the structure and enclosing the ring, the lower part of the casing being oil-tight and forming an oil reservoir, slide members engaging the ring and supporting the structure, the members being disposed on opposite sides of a vertical plane through the axis of the structure with the lower ends of their working faces above the horizontal plane tangent to the bottom of the ring, oil conduit means having first ends terminating at said working faces and a second end terminating in said reservoir at a level above said horizontal plane and below the lower ends of the working faces of the slide members, and oil circulating means interposed in said conduit and adapted to circuate oil from said second end to said first ends of said conduit means.

4. An installation which comprises, a heavy rotary structure having an encircling slide ring secured thereto, a casing encircling the structure and enclosing the ring, the lower part of the casing being oil-tight and forming an oil reservoir, slide members engaging the ring and supporting the structure, the members being disposed on opposite sides of a vertical plane through the axis of the structure with the lower ends of the working faces above the horizontal plane tangent to the bottom of the ring, oil conduit means having first ends terminating respectively at each of said working faces and a second end terminating in said reservoir, oil circulating means interposed in said conduit and adapted to circulate oil from said second end to said first ends of said conduit means, the second end of said oil conduit means being located in said reservoir at a level above said horizontal plane and below the lower ends of the working faces of the slide members, and means in which to circulate an oil cooling medium within said oil reservoir.

POUL MOLLER.

REFERENCES CITED

The following references are of record in the file of this patent:

UNITED STATES PATENTS

| Number | Name | Date |
| --- | --- | --- |
| 1,509,964 | McCarty | Sept. 30, 1924 |
| 1,514,583 | Newbigin | Nov. 4, 1924 |
| 1,745,871 | Spillman | Feb. 4, 1930 |
| 2,102,514 | Clarkson | Dec. 14, 1937 |
| 2,143,533 | Arches | Jan. 10, 1939 |
| 2,363,260 | Peskin | Nov. 21, 1944 |
| 2,447,605 | Treshow | Aug. 24, 1948 |

FOREIGN PATENTS

| Number | Country | Date |
| --- | --- | --- |
| 64,119 | Denmark | Nov. 12, 1945 |
| 64,666 | Denmark | July 15, 1946 |
| 380,876 | Germany | Sept. 13, 1923 |